(12) United States Patent
Goodman et al.

(10) Patent No.: US 7,730,271 B2
(45) Date of Patent: *Jun. 1, 2010

(54) DATA SECURITY IN AN AUTOMATED DATA STORAGE LIBRARY

(75) Inventors: Brian G. Goodman, Tucson, AZ (US); Leonard G. Jesionowski, Tucson, AZ (US); Glen A. Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 670 days.

This patent is subject to a terminal disclaimer.

(21) Appl. No.: 11/534,734

(22) Filed: Sep. 25, 2006

(65) Prior Publication Data

US 2007/0016742 A1 Jan. 18, 2007

Related U.S. Application Data

(62) Division of application No. 10/675,160, filed on Sep. 29, 2003, now Pat. No. 7,213,118.

(51) Int. Cl.
*G06F 12/14* (2006.01)

(52) U.S. Cl. ............................ 711/163; 711/161; 714/5; 714/8

(58) Field of Classification Search ........................ None
See application file for complete search history.

(56) References Cited

U.S. PATENT DOCUMENTS

| | | | |
|---|---|---|---|
| 4,725,977 A | 2/1988 | Izumi et al. | |
| 5,786,955 A | 7/1998 | Kori et al. | |
| 5,857,021 A | 1/1999 | Kataoka et al. | |
| 5,870,732 A | 2/1999 | Fisher et al. | |
| 6,044,442 A | 3/2000 | Jesionowski | |
| 6,088,182 A | 7/2000 | Taki et al. | |
| 6,104,561 A | 8/2000 | Braithwaite et al. | |
| 6,172,833 B1 | 1/2001 | Fry et al. | |
| 6,195,007 B1 | 2/2001 | Takayama et al. | |
| 6,243,796 B1 | 6/2001 | Otsuka | |
| 6,421,196 B1 | 7/2002 | Takayama et al. | |
| 6,425,059 B1 | 7/2002 | Basham et al. | |
| 6,453,369 B1 | 9/2002 | Imamura et al. | |
| 2002/0116551 A1 | 8/2002 | Imamura et al. | |
| 2003/0005246 A1 | 1/2003 | Peinado | |
| 2003/0125834 A1 | 7/2003 | Campbell et al. | |

*Primary Examiner*—Kevin Verbrugge
(74) *Attorney, Agent, or Firm*—Dan Shifrin

(57) ABSTRACT

An automated data storage library accesses data stored on storage media contained in cartridges in response to commands from an external host. The cartridges include cartridge memory and a component in the library includes a cartridge memory interface for reading data from and/or writing data to the cartridge memory. When a cartridge is to be stored in the library, the library modifies the contents of the cartridge memory such that the data stored on the cartridge becomes inaccessible, thereby preventing access to the data outside of the library. To perform an authorized access, the library restores the contents of the cartridge memory or provides a correction or correction algorithm to allow access to the data without removing the access protection of the storage media. The cartridge memory may also or alternatively include an identifier which permits access to the data only by the identified physical and/or logical library(s).

12 Claims, 12 Drawing Sheets

DATA SECURITY IN AN AUTOMATED DATA STORAGE LIBRARY

RELATED APPLICATION DATA

The present application is a divisional application of, and claims benefit of, commonly-assigned U.S. Pat. No. 7,213,118, entitled IMPROVED DATA SECURITY IN AN AUTOMATED DATA STORAGE LIBRARY, filed on Sep. 29, 2003, which application is incorporated herein by reference in its entirety.

FIELD OF THE INVENTION

The present invention relates generally to automated data storage libraries, and in particular, to providing a higher level of security for data stored on data storage media.

BACKGROUND OF THE INVENTION

Automated data storage libraries provide a means for storing large quantities of data on data storage media that are not permanently mounted in data storage drives, but are stored in a readily available form on storage shelves. One or more robot accessors retrieve selected data storage media from storage shelves and provide them to data storage drives. Typically, data stored on data storage media of an automated data storage library, once requested, is needed quickly. Thus, it is desirable that an automated data storage library be maintained in an operational condition as much as possible, such as the well known "24×7" availability.

The data storage media often contains company sensitive information such as salaries, trade secrets, financial information, etc. Some customers desire more data storage media protection or security than just locking it away in an automated data storage library. For example, a customer may want protection from removing a data storage cartridge from one library and placing it into another library or drive for reading and/or overwriting the data on the storage media. The issue may be greater with partitioned libraries where there is a chance that the data storage media may be accidentally, or intentionally, moved from one logical library into another logical library.

U.S. patent application Ser. No. 09/977,159 (U.S. application publication No. 2003/0074319), filed Oct. 11, 2001, (incorporated herein by reference) addresses some of these problems by encrypting all or most of the data on the storage media but this requires special drive hardware. In addition, since the data is encrypted on the data storage media, it becomes very difficult to move the data storage media to a drive or system that does not support the encryption scheme. To do this would require that the entire contents of the data storage media be read, decrypted, and then written again. Still further, Ser. No. 09/977,159 does not address encryption key management between multiple drives and/or multiple data storage cartridges. U.S. Pat. No. 6,104,561 to Braithwaite, et al. describes a method that writes a code in the data of a data storage medium to prevent unauthorized reading and/or writing of the data storage media but this requires writing of the data storage medium in order to change the security features. Moreover, the code written to the media serves merely as a flag which is indicative of the level of protection to be given to the recorded data.

Therefore, a need remains for improved data storage media security in an automated data storage library without the limitations of previous efforts.

SUMMARY OF THE INVENTION

In a first embodiment, the automated data storage library modifies the contents of the cartridge memory of one or more data storage cartridges so that the data is normally inaccessible to a data storage drive. When the data storage media is needed by the library, a correction or correction algorithm is sent to the drive to allow it to access the data storage media for read and/or write operations. Alternatively, the contents of the cartridge memory are modified to make the data accessible. If an attempt to access data storage media is made, by removing a cartridge from a library and inserting it into a drive for example, the drive will not be able to read from and/or write to the data storage media.

In a second embodiment, the library is partitioned into two or more logical libraries. The library writes an identifier into the cartridge memory of one or more data storage cartridges. The identifier is associated with one or more logical libraries. The library communicates the identifier to one or more drives and the one or more drives use the identifier to prevent or allow read and/or write access to the data storage medium. If a data storage cartridge is moved into the drive of a different logical library, then the drive will prevent read and/or write access to the data storage medium.

In a third embodiment, the library writes an identifier into the cartridge memory of one or more data storage cartridges. The identifier is associated with one or more physical libraries. The library communicates the identifier to one or more drives and the one or more drives use the identifier to prevent or allow read and/or write access to the data storage medium. If a data storage cartridge is moved into the drive of a different physical library, then the drive will prevent read and/or write access to the data storage medium.

In a fourth embodiment, the second and third embodiments are combined to provide maximum security and protection for a partitioned library. Accidental or intentional data storage media access is prevented from different logical libraries within the same physical library or within another physical library.

For the second, third, and fourth embodiments, library association information is written to each cartridge memory as described in FIG. 8. Library association information is also written to each drive as described in the flowchart of FIG. 9. The drive compares the association information in the cartridge memory to the association information in the drive and determines if the media is accessible, as described in the flowchart of FIG. 10.

In a fifth embodiment, this invention may be combined with U.S. patent application Ser. No. 09/977,159 (U.S. application publication No. 2003/0074319), filed Oct. 11, 2001 (incorporated herein by reference) to provide an automated method of securing the data on data storage media in a removable media system. In this case, the keys for gaining access to the data on the data storage medium may be managed in part, or in full, by the automated data storage library. The library may provide the keys to the data storage drive during a move operation, after a library configuration, after a drive or library power-on or at some other time.

In all embodiments, the cartridge memory may be modified directly by a component of the library, such as a cartridge memory reader/writer or interface located on or about the library accessor. Alternatively, the cartridge memory may be modified indirectly by using one or more data storage drives. The modifications to the cartridge memory may be encrypted or may require encryption/decryption keys to access. The library may provide a data storage media export operation that removes the cartridge memory access limitations. This may be especially desirable where data protection is more important than data security. In this way, the data storage media may be accessible by drives and libraries which would not normally allow access with the full protection and security mechanisms of this invention.

The physical and logical library association information of the second, third and fourth embodiments may be better understood by referring to commonly-owned U.S. patent application Ser. No. 10/356,577, filed Feb. 3, 2003, now U.S. Pat. No. 6,898,480, and commonly owned U.S. patent application Ser. No. 10/356,487, now U.S. Pat. No. 6,895,300, filed Feb. 3, 2003 (both of which are incorporated herein by reference). The communication to the drive may be encrypted or may require encryption/decryption keys.

Certain aspects of this invention are not intended to provide maximum data security which would require encryption of the actual data on the storage medium. Under such a system, either special drive hardware would be required or performance and data storage media capacity would be impacted. If decryption keys are lost or destroyed then the data would be totally inaccessible. In addition, moving the data storage media from one library to another would require movement of the decryption keys, making it easier for the keys to be misappropriated.

This invention improves upon existing automated data storage libraries by offering a higher level of security and protection whereby data storage media may not be read from and/or written to, accidentally or intentionally, without overriding a protection mechanism.

This invention may be combined with other, higher security, solutions to provide an overall system solution.

DETAILED DESCRIPTION OF THE INVENTION

Figure 1:
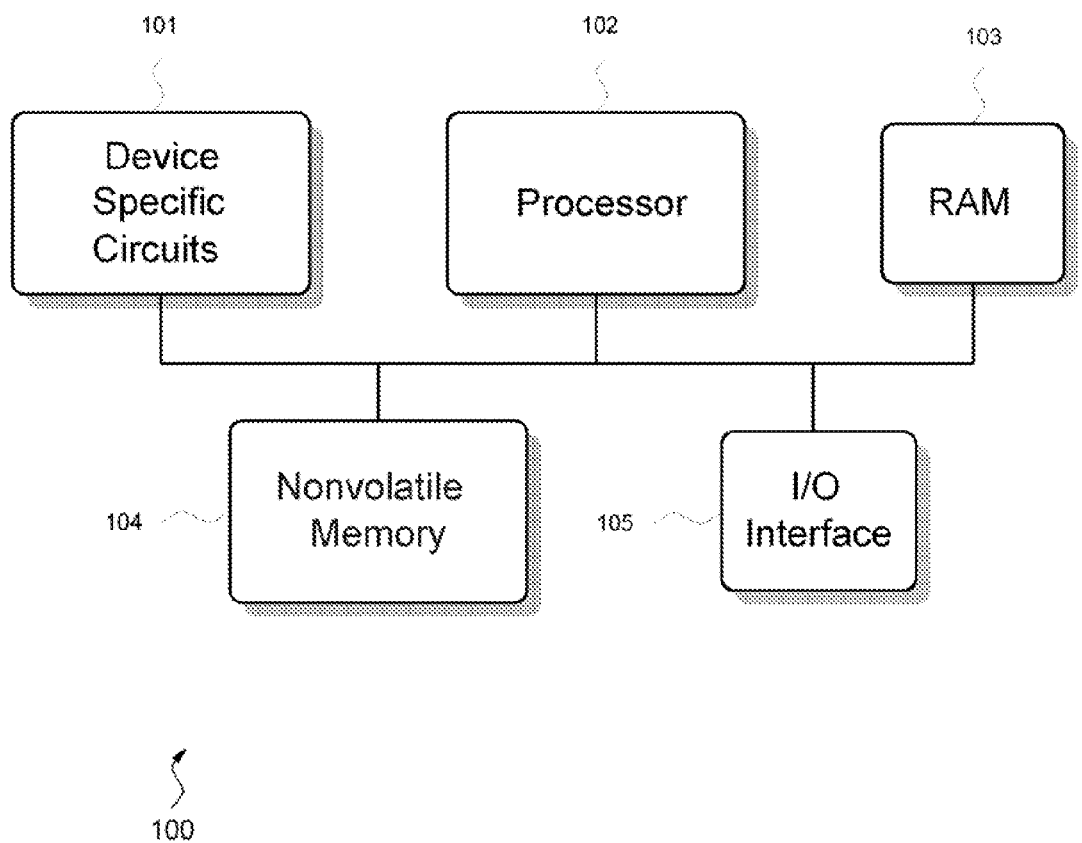
FIG. 1 is a block diagram of an automated data storage library controller and/or a drive controller in which the present invention may be incorporated.

An automated data storage library typically contains one or more controllers to direct the operation of the automated data storage library. In addition, each data storage drive within the library typically comprises one or more controllers to direct the operation of the data storage drive. The controller(s) may take many different forms and may comprise an embedded system, a distributed control system, a personal computer, workstation, etc. FIG. 1 shows a typical controller 100 with a processor 102, RAM (Random Access Memory) 103, nonvolatile memory 104, device specific circuits 101, and I/O interface 105. Alternatively, the RAM 103 and/or nonvolatile memory 104 may be contained in the processor 102 as could the device specific circuits 101 and I/O interface 105. The processor 102 may comprise an off the shelf microprocessor, custom processor, FPGA (Field Programmable Gate Array), ASIC (Application Specific Integrated Circuit), discrete logic, etc. The RAM (Random Access Memory) 103 is typically used to hold variable data, stack data, executable instructions, etc. The nonvolatile memory 104 may comprise any type of nonvolatile memory such as EEPROM (Electrically Erasable Programmable Read Only Memory), flash PROM (Programmable Read Only Memory), battery backup RAM, hard disk drive, etc. The nonvolatile memory 104 is typically used to hold the executable firmware and any nonvolatile data. The I/O interface 105 is a communication interface that allows the processor 102 to communicate with devices external to the controller. Examples may comprise serial interfaces such as RS-232 or USB (Universal Serial Bus), SCSI (Small Computer Systems Interface), Fibre Channel, etc. The device specific circuits 101 provide additional hardware to enable the controller 100 to perform unique functions such as motor control of a cartridge gripper, etc. The device specific circuits 101 may comprise electronics that provide Pulse Width Modulation (PWM) control, Analog to Digital Conversion (ADC), Digital to Analog Conversion (DAC), etc. In addition, some of all of the device specific circuits 101 may reside outside the controller 100.

Figure 2:
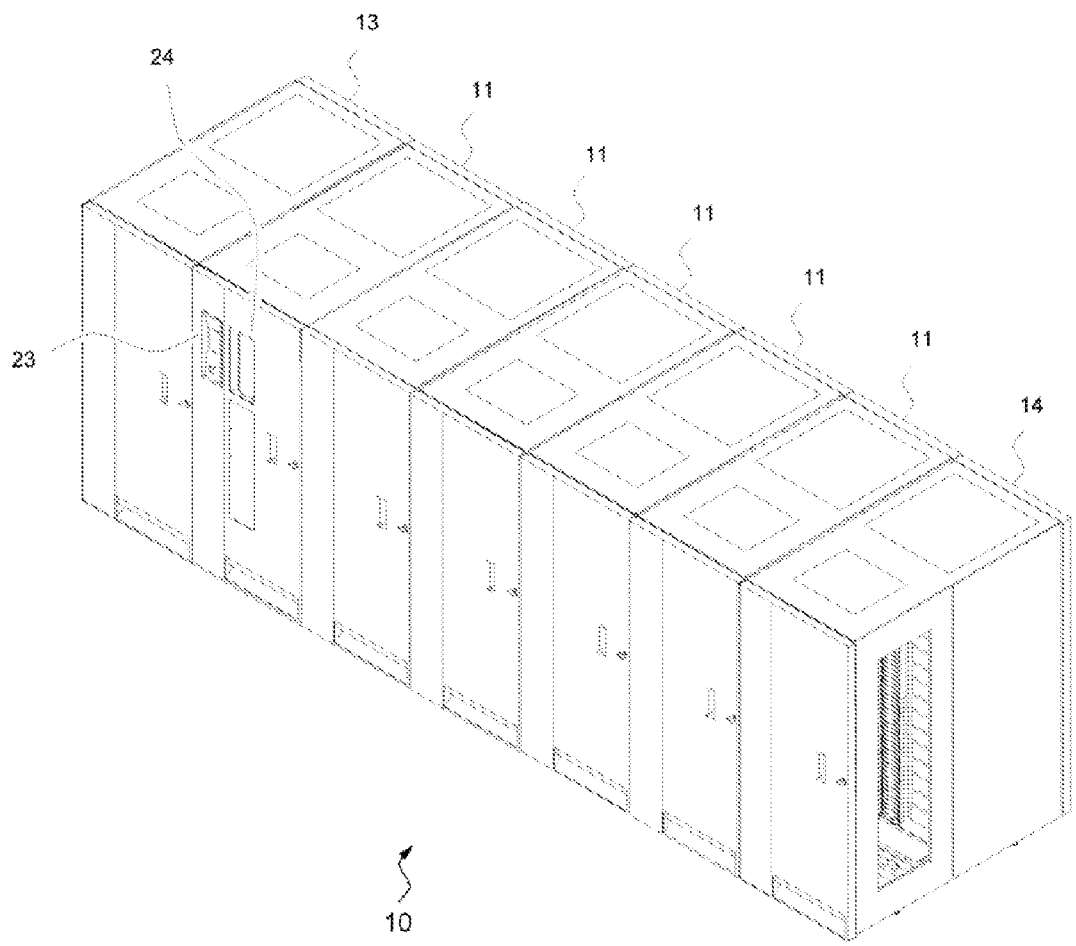
FIG. 2 illustrates a multi-frame automated data storage library in which the present invention may be incorporated.
Figure 3:
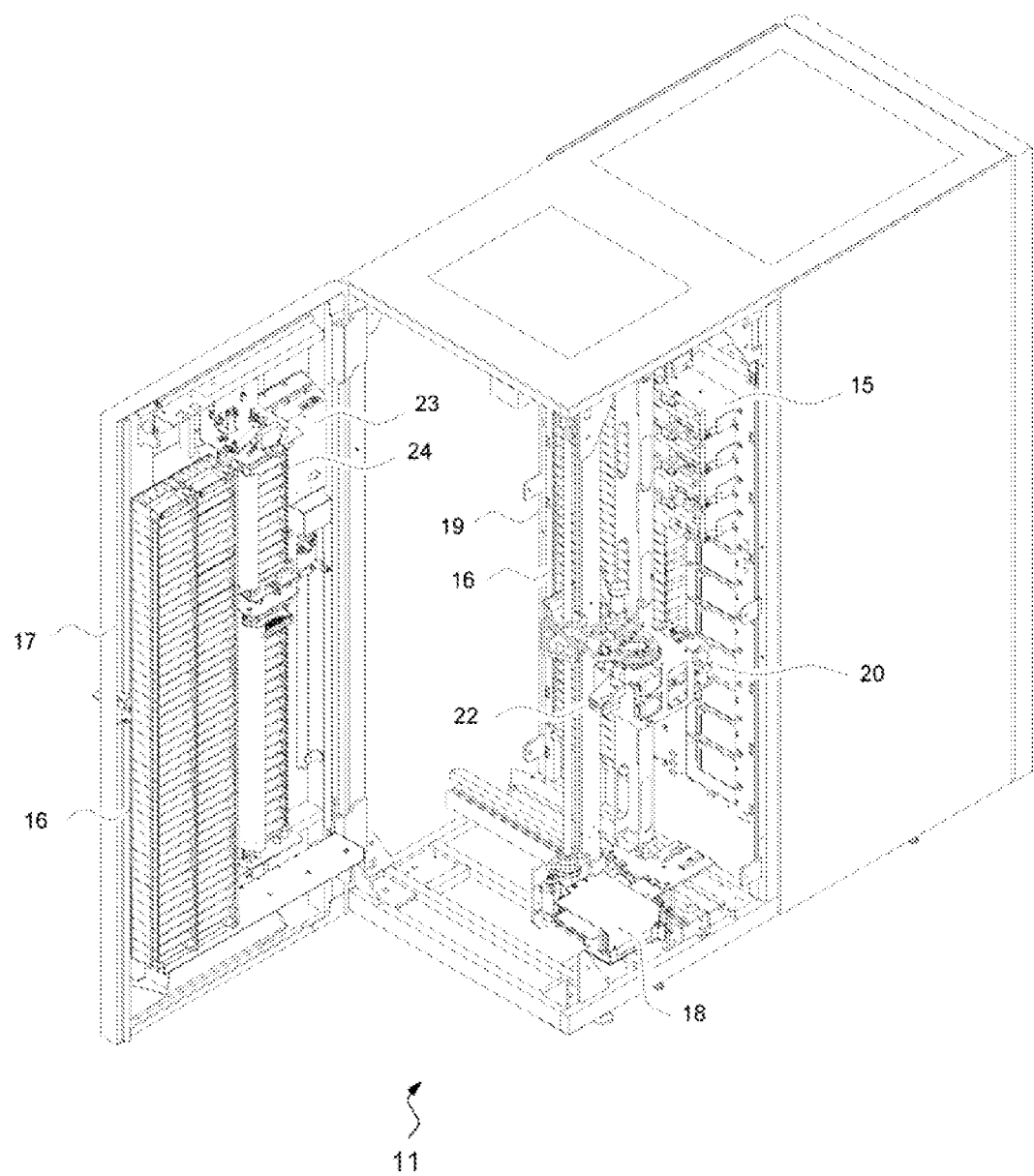
FIG. 3 illustrates the interior of one frame of the automated data storage library of FIG. 2.

FIG. 2 illustrates an automated data storage library 10 with a left hand service bay 13, one or more storage frames 11, and a right hand service bay 14. As will be discussed, a frame may comprise an expansion component of the library 10. Frames may be added or removed to expand or reduce the size and/or functionality of the library 10. Frames may comprise additional storage shelves, drives, import/export stations, accessors, operator panels, etc. FIG. 3 shows an example of a storage frame 11, which also is the minimum configuration of the library 10. In this minimum configuration, there are no redundant accessors or service bays. The storage frame 11 is arranged for accessing data storage media (not shown) in response to commands from at least one external host system (not shown), and comprises a plurality of storage shelves 16, on a front wall 17 and a rear wall 19, for storing data storage cartridges which contain data storage media; at least one data storage drive 15 for reading and/or writing data from/to the data storage media; and a first accessor 18 for transporting the data storage media between the plurality of storage shelves 16 and the data storage drive(s) 15. The storage frame 11 may optionally comprise an operator panel 23 or other user interface, such as a web-based interface, which allows a user to interact with the library 10. The storage frame 11 may optionally comprise an import/export station 24, which allows data storage cartridges to be inserted into and/or removed from the library 10 without disrupting library operation. The library 10 may comprise one or more storage frames 11, each having storage shelves 16 accessible by first accessor 18. As described above, the storage frames 11, may be configured with different components depending upon the intended function. One configuration of the storage frame 11 may comprise storage shelves 16, data storage drive(s) 15, and other optional components to store and retrieve data from the data storage cartridges. The first accessor 18 comprises a gripper assembly 20 for gripping one or more data storage cartridges and may include a bar code scanner 22 or other reading system, such as a smart card reader or the like, mounted on the gripper 20 to "read" identifying information about the data storage media.

Figure 4:
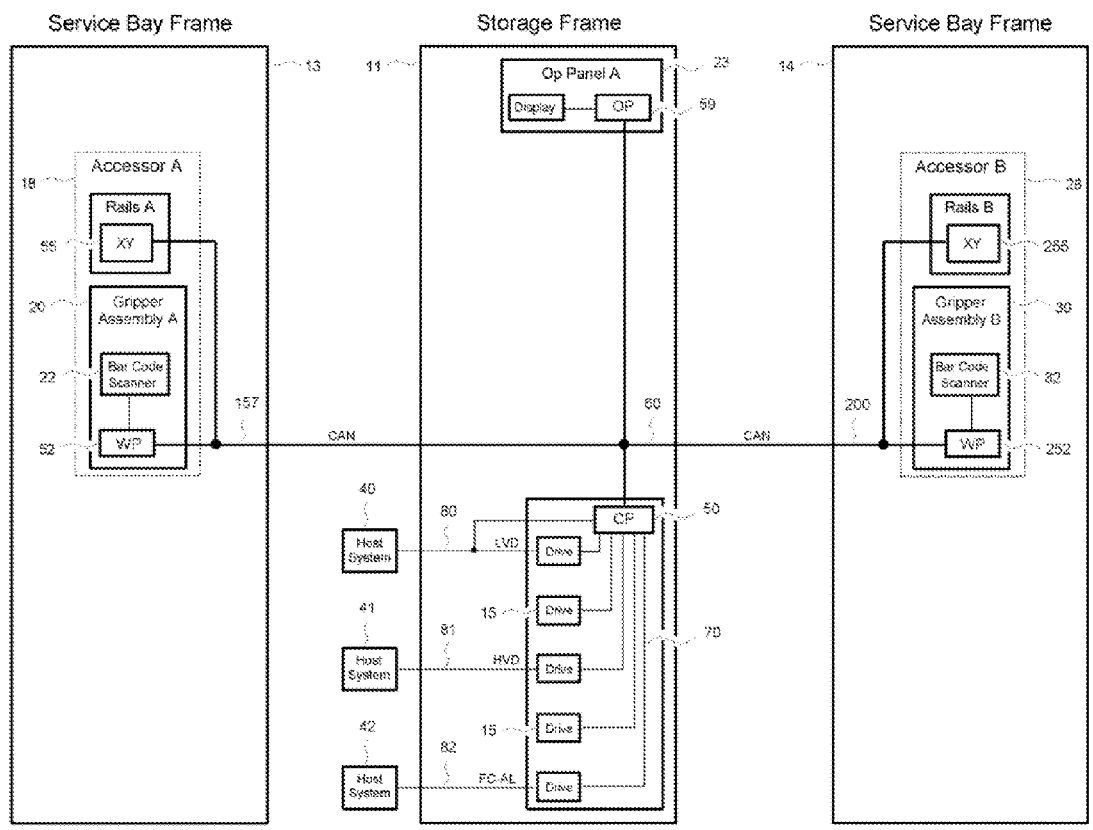
FIG. 4 is a block diagram of a three-frame automated data storage library, employing a distributed system of modules with a plurality of processor nodes.

FIG. 4 illustrates an embodiment of an automated data storage library 10 of FIGS. 2 and 3, which employs a distributed system of modules with a plurality of processor nodes. An example of an automated data storage library which may implement the present invention is the IBM 3584 UltraScalable Tape Library. The library 10 of FIG. 4 comprises one or more storage frames 11, a left hand service bay 13 and a right hand service bay 14.

The left hand service bay 13 is shown with a first accessor 18. As discussed above, the first accessor 18 comprises a gripper assembly 20 and may include a reading system 22 to "read" identifying information about the data storage media. The right hand service bay 14 is shown with a second accessor 28. The second accessor 28 comprises a gripper assembly 30 and may include a reading system 32 to "read" identifying information about the data storage media. In the event of a failure or other unavailability of the first accessor 18, or its gripper 20, etc., the second accessor 28 may perform all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14. Nor is the description herein intended to limit the number of accessors to two or to any other specific number.

In the library 10, first accessor 18 and second accessor 28 moves their grippers in at least two directions, called the horizontal "X" direction and vertical "Y" direction, to retrieve and grip, or to deliver and release the data storage media at the storage shelves 16 and the data storage drives 15.

The library 10 receives commands from one or more host systems 40, 41 or 42. The host systems, such as host servers, communicate with the library 10 directly, e.g., on path 80, through one or more control ports (not shown), or through one or more data storage drives 15 through lines 70, providing commands to access particular data storage media and move the media, for example, between the storage shelves 16 and the data storage drives 15. The commands are typically logical commands identifying the media and/or logical locations for accessing the media.

The library 10 is controlled by a distributed control system receiving the logical commands from hosts, determining the required actions, and converting the actions to physical movements of first accessor 18 and/or second accessor 28. The distributed control system may comprise a plurality of processor nodes, each having one or more processors. In one example of a distributed control system, a communication processor node 50 may be located in a storage frame 11. The communication processor node provides a communication link for receiving the host commands, either directly or through the drives 15, via at least one external interface e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, for example, a work processor node 52 that may be located at first accessor 18, and which is coupled to the communication processor node 50 via a network 60, 157. Each work processor node may respond to received commands that are broadcast to the work processor nodes from any communication processor node, and the work processor node may also direct the operation of first accessor 18 providing move commands. An XY processor node 55 may be provided and may be located at an XY system of first accessor 18. The XY processor node 55 is coupled to the network 60, 157, and is responsive to the move commands, operating the XY system to position the gripper 20.

Also, an operator panel processor node 59 may be provided at the optional operator panel 23 for providing an interface for communicating between the operator panel and the communication processor node 50, the work processor node 52, and the XY processor node 55.

A network, for example comprising a common bus 60 couples the various processor nodes. The network may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other similar networks, such as Ethernet, or a wireless network system, such as RF or infrared, may also be employed in the library 10.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library 10 to the host system(s) with a library interface similar to the drive/library interface. Various communication arrangements may be employed for communication with the hosts and with the data storage drives. In the example of FIG. 4, host connections 80 and 81 are SCSI busses. The bus 82 comprises an example of a Fiber Channel-Arbitrated Loop which is a high speed serial data interface, allowing transmission over greater distances than the SCSI bus systems. Alternatively, the data storage drives may be coupled to the communication processor node 50 through one or more networks, such as a common bus network.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70.

Additional storage frames 11 may be provided and each is coupled to the adjacent storage frame. Any of the storage frames 11 may comprise communication processor nodes 50, storage shelves 16, data storage drives 15, and networks 60.

Further, the automated data storage library 10 may additionally comprise a second accessor 28 shown, for example, in a right hand service bay 14 of FIG. 4. The second accessor 28 may comprise a gripper 30 for accessing the data storage media, and an XY system 255 for moving the second accessor 28 The second accessor 28 may run on the same horizontal mechanical path as first accessor 18, or on an adjacent path. The exemplary control system additionally comprises an extension network 200 forming a network coupled to network 60 of the storage frame(s) 11 and to the network 157 of left hand service bay 13.

In FIG. 4 and the accompanying description, the first and second accessors are associated respectively with the left hand service bay 13 and the right hand service bay 14, respectively. This is for illustrative purposes and there may not be an actual association. In addition, the network 157 may not be associated with the left hand service bay 13 and the network 200 may not be associated with the right hand service bay 14. Depending upon the design of the library 10, it may not be necessary to have a left hand service bay 13 and/or a right hand service bay 14.

Figure 5A:
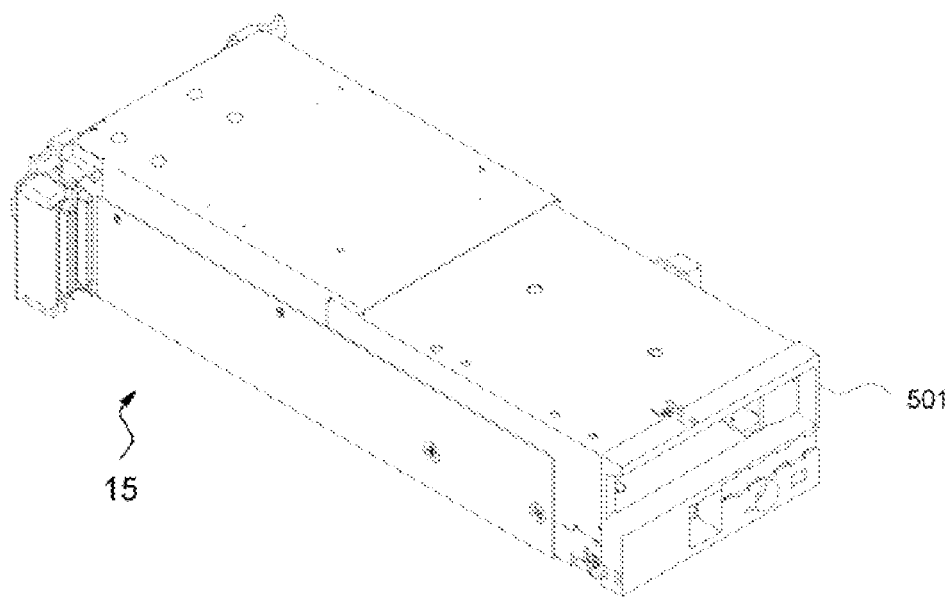
FIGS. 5A and 5B illustrate front and rear views, respectively, of a removable media tape drive.
Figure 5B:
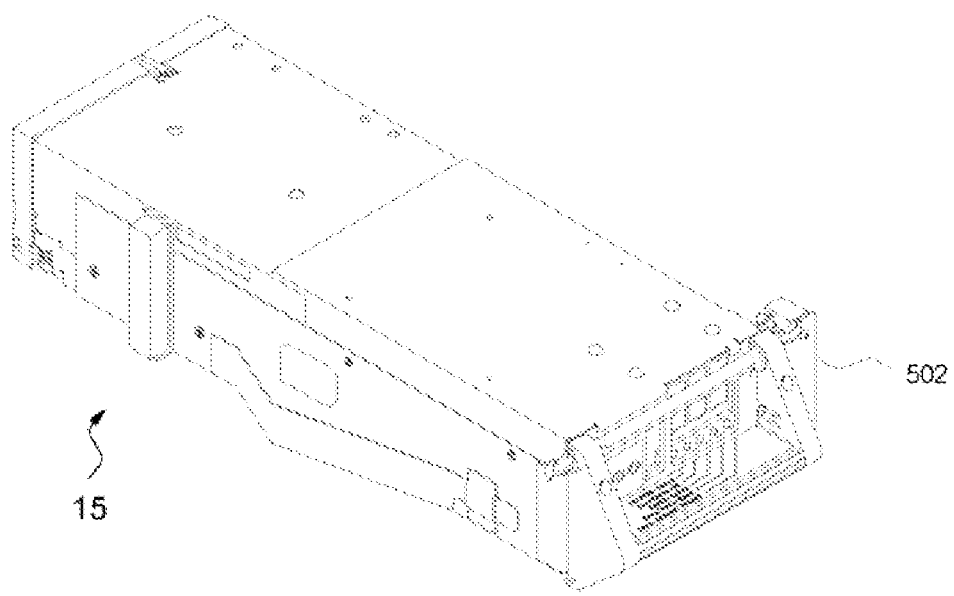

FIGS. 5A and 5B illustrate the front 501 and rear 502, respectively, of the drive 15. In this example, the drive 15 is a removable media LTO (Linear Tape Open) tape drive mounted in a hot swap canister. However, the data storage drive of this invention may comprise any removable media drive such as magnetic or optical tape drives, magnetic or optical disk drives, electronic media drives, or any other removable media drive as is known in the art. In addition, the data storage drive of this invention may comprise any fixed media drive such as hard disk drives or any other fixed media drive as is known in the art. In this case, the fixed media drives may be moved around the library in a similar way that the present invention describes the movement of media.

Figure 6A:
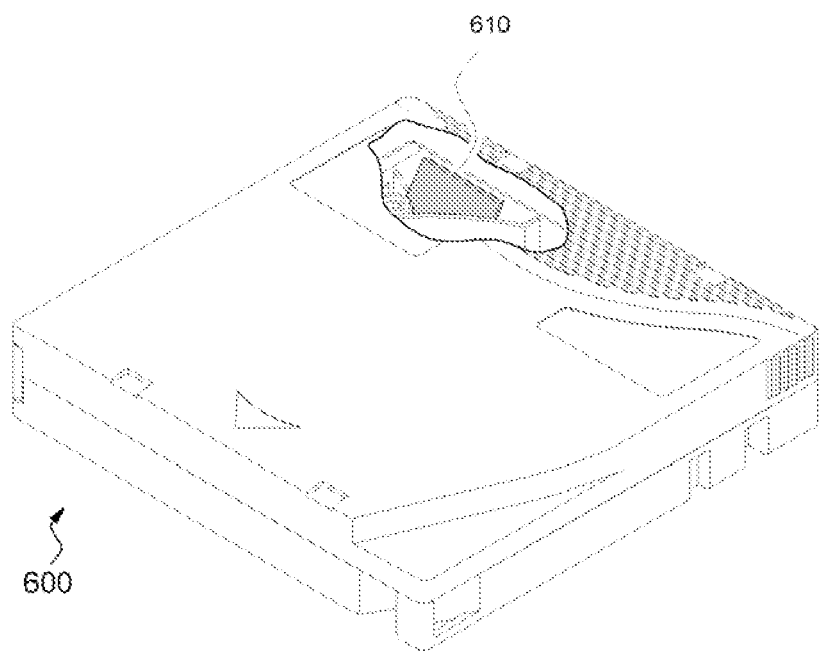
FIGS. 6A and 6B illustrate a data storage cartridge with a cartridge memory for use with the present invention.
Figure 6B:
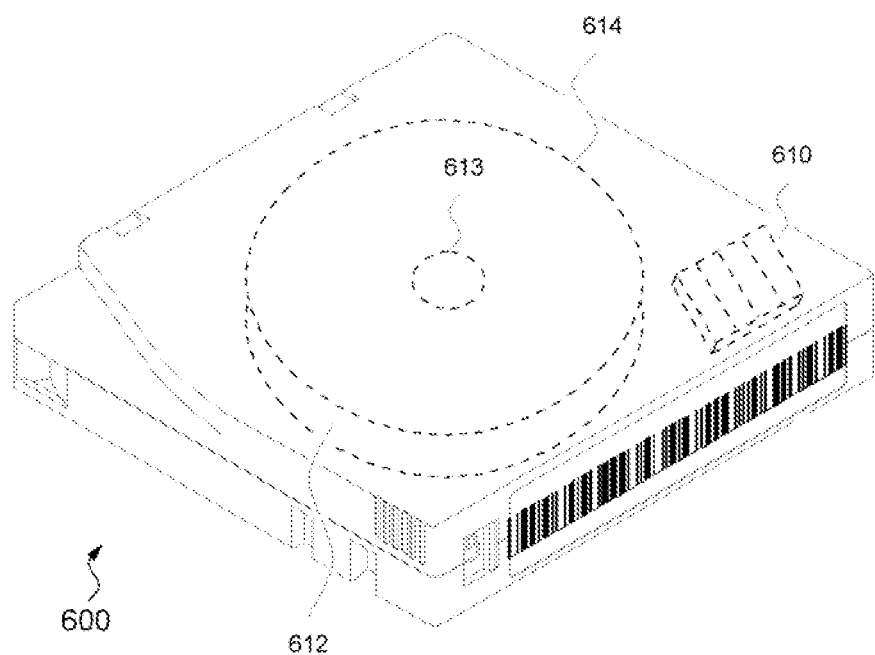

FIG. 6A illustrates an example of a data storage cartridge 600 with a cartridge memory 610. FIG. 6B illustrates an example of a tape cartridge 600 with a cartridge memory 610, media reel 614, reel hub 613 and media 612 all shown in phantom. While FIG. 6B illustrates tape media, media 612 may comprise any type of data storage media as is known to those of skill in the art. The contents of the cartridge memory 610 may be accessed (written to and/or read from) by a cartridge memory interface, such as a cartridge memory interface integrated into the drive 15. The cartridge memory interface may also be integrated into other components of the library 10, such as a robot accessor.

In a first embodiment, the automated data storage library 10 modifies the contents of the cartridge memory 610 or the contents of the media 612 of one or more data storage cartridges 600 so that the data stored on the media 612 is normally inaccessible to a data storage drive. When the data storage cartridge 600 is needed by the library 10, a correction or correction algorithm is sent to the drive to allow it to access the data storage media for read and/or write operations. Alternatively, the contents of the cartridge memory 610 or the contents of the media 612 are modified to make the data accessible. If an attempt to access data storage media is made, by removing a cartridge 600 from a library and inserting into a drive for example, the data storage media 612 will not be readable or writable.

Figure 7:
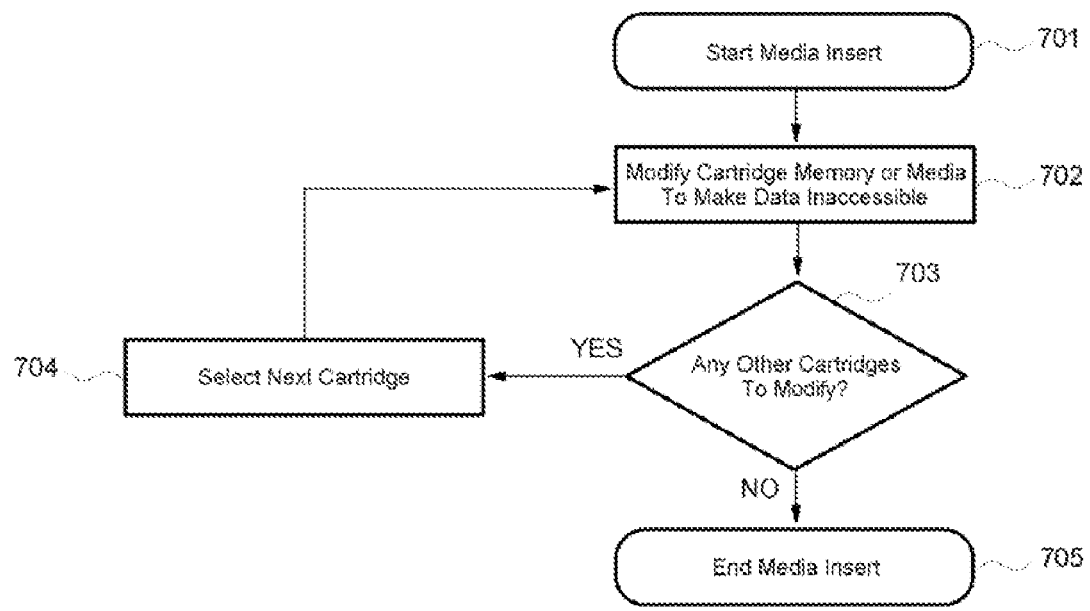
FIG. 7 is a flow chart of one method of the present invention.

FIG. 7 illustrates the method of the first embodiment upon insertion of a data storage cartridge into the library 10. The data storage cartridge 600 may be inserted through a special purpose import/export station or it may be inserted by simply opening a library door and placing the media on a storage shelf or in a drive. The procedures set forth in the flow chart may also be used when the library 10 is initialized or brought up for the first time. The procedures may be executed by a host computer, by the library 10, by an operator, or by some other means. The media insert operation is started at step 701. The media insert operation may be initiated by a host computer, by the library 10, by an operator, or by some other means. The cartridge memory 610 is modified in step 702. The cartridge memory 610 modification prevents the media 612 from being accessed without explicit action to reverse the modification. For example, the LTO (Linear Tape Open) cartridge memory format provides a data field in the cartridge memory which specifies the media generation. A value may be placed in this field which specifies a media generation that does not exist. Thus if the data storage media 600 is accidentally, or intentionally, inserted into an LTO drive, the media would not be supported and the drive would prevent data access. Alternatively, the contents of the cartridge memory 610 may be intentionally corrupted so that the data storage cartridge 600 would be rejected by a data storage drive. The cartridge memory 610 may be modified by a component of the library 10. For example, the library accessor 18 may contain a cartridge memory interface to modify the cartridge memory 610. Another alternative is that the cartridge memory 610 may be modified by the cartridge memory interface in the data storage drive 15. For example, the library 10 may be used to move the data storage media 600 into a drive 15 and the drive 15 would be instructed to modify the cartridge memory 610. In another variation, the actual media 612 may be modified, rather than the cartridge memory 610. In this case, a component of the library 10, such as the data storage drive 15, may have the means to modify the contents of the data storage media 612. Herein, to simplify the description and claims, any references to cartridge memory may also refer to data storage medium since this invention may be equally applied to modification and/or corruption of both. In addition any references to a cartridge memory interface may also refer to a data storage media interface for the same reasons. In step 703, a check is made to see if any other data storage cartridges require modification of the cartridge memory 610 or the data storage media 612. If there are no additional cartridges to modify, as indicated in step 703, control moves to step 705 where the media insert operation is completed. If on the other hand, there are additional data storage cartridges to modify, as indicated in step 703, then control moves to step 704 where the next data storage cartridge is selected. Control then moves to step 702 where the newly selected cartridge is appropriately modified. It will be appreciated that changes may be made to the process without deviating from the scope of the invention.

Figure 8:
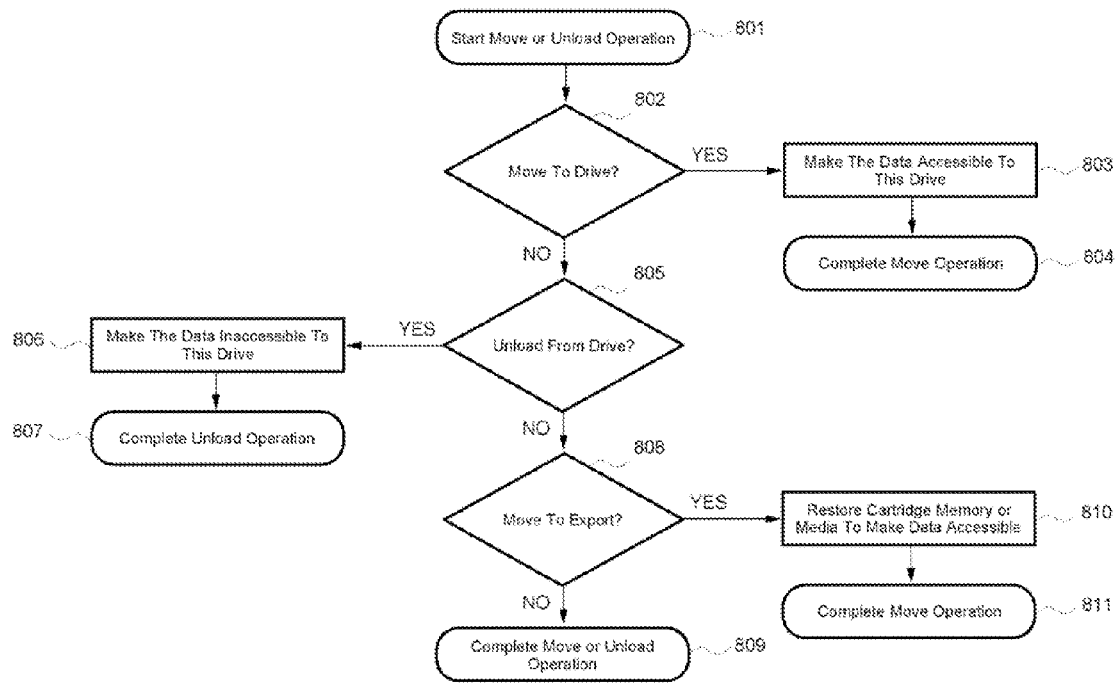
FIG. 8 is a flow chart of another method of the present invention.

FIG. 8 illustrates a method of the first embodiment in which data storage media is moved to or unloaded from a data storage drive 15 or in which data storage media is exported from the library 10. This process illustrated in the flowchart may be executed by a host computer, by the library 10, by an operator, or by some other means. The data storage media move or unload operation begins at step 801. This operation may be initiated by a host computer, an operator, the library controller or from some other source. In step 802, the operation is checked to see if it involves the movement of data storage media to a drive 15. If the operation involves a move to a drive 15 as indicated in step 802, then control moves to step 803 in which a correction or correction algorithm is sent to the drive. The correction or correction algorithm comprises information that allows the drive to read and/or write the data storage media without removing the modification or corruption that has been applied to the cartridge memory 610 or the media 612. For example, in the case where a cartridge memory media generation field has been modified to make the data on the storage medium inaccessible, the correct generation field would now be provided by the library to allow media access by the drive. In another example, in the case where the contents of the cartridge memory 610 has been corrupted to prevent access to data stored in the data storage media, the algorithm to correct the cartridge memory 610 would now be sent by the library to allow access to the data. As a more specific example, the library may have applied a logical exclusive-or operation to all or part of the cartridge memory to prevent access to the data storage medium. The library may send the exclusive-or pattern to the drive so the pattern can be used to remove the corruption from the cartridge memory data. The correction information that the library sends to the drive may provide enough information to allow the drive to apply the corruption or modification from step 702 (FIG. 7) and/or step 806 (FIG. 8). This is because the modified information from cartridge memory 610 may comprise information that is normally updated during read and/or write operations to the media. The drive may be required to provide an updated cartridge memory and it may be desired that the update is protected with the same algorithm that was used in prior steps. Step 803 may occur at any time. For example, correction information may be provided to the drive at power-on time or at library configuration. If the drive has the ability to store the correction information in nonvolatile memory then it may not be necessary to send new correction information until the library configuration has changed. Herein, correction, correction algorithm, and correction information all refer to the same thing. Referring back to FIG. 8, alternatively, at step 803, the cartridge memory 610 or media 612 may be restored to a state where the drive 15 can access the media. For example, in the case where a cartridge memory media generation field has been modified to make the data on the storage medium inaccessible, the generation field would now be restored to a correct value for media access. In another example, in the case where the contents of the cartridge memory 610 has been corrupted to prevent access to data stored in the data storage media, the corrupted cartridge memory 610 would now be corrected to allow access to the data. After step 803, control moves to step 804 where the move operation is completed. The actual move operation may occur prior to step 804. For example, if the drive is used to modify the cartridge memory then the data storage cartridge may be moved to the drive at or before step 803. If however, the operation does not involve a move to a drive 15 as indicated in step 802, then control moves to step 805 where the operation is checked to see if it involves the unload of data storage media from a drive 15. The actual unload operation may occur prior to step 807. For example, if a component of the library is used to modify the cartridge memory then the cartridge may be unloaded from the drive at or before step 806. If the operation involves an unload from a drive 15 as indicated in step 805, then control moves to step 806 where the correction information is revoked or removed from the drive. This may be the result of a library request to remove the correction information or the drive may perform this action as the result of a media eject or some other media operation. Alternatively, it may be desired to maintain correction information for a longer period of time. For example, the drive may maintain the correction information until a media export operation, a drive or library power cycle, etc. Alternatively, if the actual contents of the cartridge memory were modified in step 803 then the cartridge memory 610 may be modified in step 806 so that the data in the cartridge would not be accessible. As described above, this may comprise the modification of a generation field of the cartridge memory 610, corrupting the contents of the cartridge memory 610 or some other modification of the cartridge memory 610. In addition, this may involve modification or corruption of the data storage media 612 as discussed above. After step 806, control moves to step 807 where the unload operation is completed. If the operation does not involve an unload from a drive 15 as indicated in step 805, then control moves to step 808 where the operation is checked to see if it involves an export of data storage cartridge 600 from the library. An export refers to the removal of data storage media 600 from the library 10. For example, many libraries comprise an import/export station 24 (FIGS. 2 and 3) where data storage cartridges may be moved to/from the library 10 by an operator. If the operation involves an export operation as indicated in step 808, then control moves to step 810 where the cartridge memory 610 is restored to a state where the drive 15 can access the media. For example, in the case where a cartridge memory media generation field has been modified to make the data on the storage medium inaccessible, the generation field would now be restored to a correct value for media access. In another example, in the case where the contents of the cartridge memory 610 has been corrupted to prevent access to data stored in the data storage media 600, the corrupted cartridge memory 610 would now be corrected to allow access to the data. Making the data on the data storage media 600 accessible during an export operation may be desired to allow the media to be moved from one library to another. Additional security may be provided to protect from accidental or intentional exports of data storage media. For example, an operator may be required to enter a password at a user interface before initiating the export operation. In addition, the library may offer different levels of export. For example, there may be one with corrected cartridge memory 610 so that the data in the data storage media 600 is accessible after export and one where no correction is made to the cartridge memory 610 such that the data remains inaccessible after export. Referring back to FIG. 8, after the cartridge memory 610 is modified to make the data in the data storage media 600 accessible in step 810, control moves to step 811 where the operation is completed. If however, the operation does not involve an export operation as indicated in step 808, then control moves to step 809 where the operation is completed. It will be appreciated that changes may be made to the process illustrated by the flowchart without deviating from the scope of the invention. For example, step 808 may be combined with step 802 where a move to a drive 15 or a move involving an export would both result in the same action of steps 803 and 804. In this case, steps 810 and 811 would be eliminated. In another example, it may not be desired to support exports of unprotected media so steps 808, 810 and 811 may be eliminated. In this case, a "NO" answer from step 805 would result in the execution of step 809.

In a second embodiment, the library 10 is partitioned into two or more logical libraries. The library 10 writes an identifier into the cartridge memory 610 of one or more data storage cartridges 600. The identifier is associated with one or more logical libraries. The library 10 communicates the identifier to one or more drives 15 which use the identifier to prevent or allow read and/or write access to the data storage media. If a data storage cartridge is moved into the drive of a different logical library, then that drive will prevent read and/or write access to the data storage media. The second embodiment may be combined with the first embodiment. For example, the cartridge memory may be modified or corrupted as discussed above. A match between the identifier in the cartridge memory and the identifier in the drive may comprise allowing the contents of the media to be accessed.

In a third embodiment, the library 10 writes an identifier into the cartridge memory 610 of one or more data storage cartridges. The identifier is associated with one or more physical libraries. The library 10 communicates the identifier to one or more drives 15 which store and use the identifier to prevent or allow read and/or write access to the data storage media. If a data storage cartridge is moved into the drive 15 of a different physical library then that drive 15 will prevent read and/or write access to the data storage media. The second embodiment may be combined with the first embodiment. For example, the cartridge memory may be modified or corrupted as discussed above. A match between the identifier in the cartridge memory and the identifier in the drive may comprise modification to the cartridge memory to allow the contents of the media to be accessed.

In a fourth embodiment, the second and third embodiments may be combined to provide still further security and protection for a partitioned library. It will prevent accidental or intentional data storage media access by different logical libraries within the same physical library or by another physical library. An example of storing physical and logical library association information in a cartridge memory can be seen by referring to U.S. patent application Ser. No. 10/356,577, filed Feb. 3, 2003 and U.S. patent application Ser. No. 10/356,487, filed Feb. 3, 2003. Library association information is written to each cartridge as described in the flowchart of FIG. 9. Library association information is also written to a memory in each drive 15 as described in the flowchart of FIG. 10. When an attempt is made to move a data storage cartridge 600 to a drive 15, the association information in the cartridge memory 610 is compared with the association information of the drive 15 to determine if the data is accessible or not, as described in the flowchart of FIG. 11.

Figure 9:
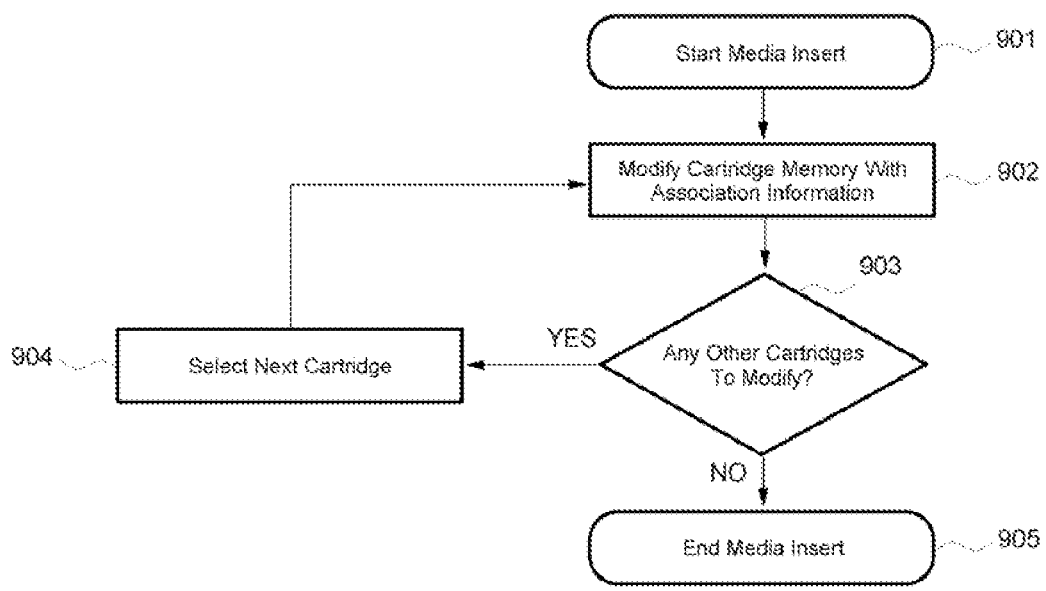
FIG. 9 is a flow chart of another method of the present invention.

FIG. 9 illustrates the process of the second embodiment and/or the third embodiment when data storage media is inserted into the library 10. A data storage cartridge 600 may be inserted through a special purpose import/export station or it may be inserted by opening a library door and placing the media on a storage shelf or in a drive. The process illustrated in the flow chart may also be used when the library 10 is initialized or brought up for the first time. This flowchart may be executed by a host computer, by the library 10, by an operator, or by some other means. The media insert operation is started at step 901. The media insert operation may be initiated by a host computer, by the library 10, by an operator, or by some other means. The cartridge memory 610 is modified in step 902. The cartridge memory modification comprises library association information and may comprise additional modification or corruption to make the data inaccessible as discussed above. The library association may comprise a logical library association, a physical library association, both or some other library association information. The association information is used to validate the data storage media 612 access in a drive 15, as will be discussed. The cartridge memory 610 may be modified by a component of the library 10. For example, the library accessor may contain the means to modify the cartridge memory 610. The cartridge memory 610 may also be modified by a data storage drive 15. For example, the library 10 may be used to move the data storage cartridge 600 into a drive 15 where the drive 15 would be instructed to modify the cartridge memory 610. In another variation of this embodiment, the actual media 612 may be modified, rather than the cartridge memory 610. In this case, a component of the library 10, such as the drive 15, may have the means to modify the contents of the data storage media 612. In step 903, a check is made to see if any other data storage cartridges require modification of the cartridge memory 610 or the data storage media 612. If there are no additional cartridges to modify, as indicated in step 903, control moves to step 905 where the media insert operation is completed. If on the other hand, there are additional data storage cartridges to modify, as indicated in step 903 then control moves to step 904 where the next data storage cartridge is selected. Control then moves to step 902 where the newly selected cartridge is written. It will be appreciated that changes may be made to the process without deviating from the scope of the invention.

Figure 10:
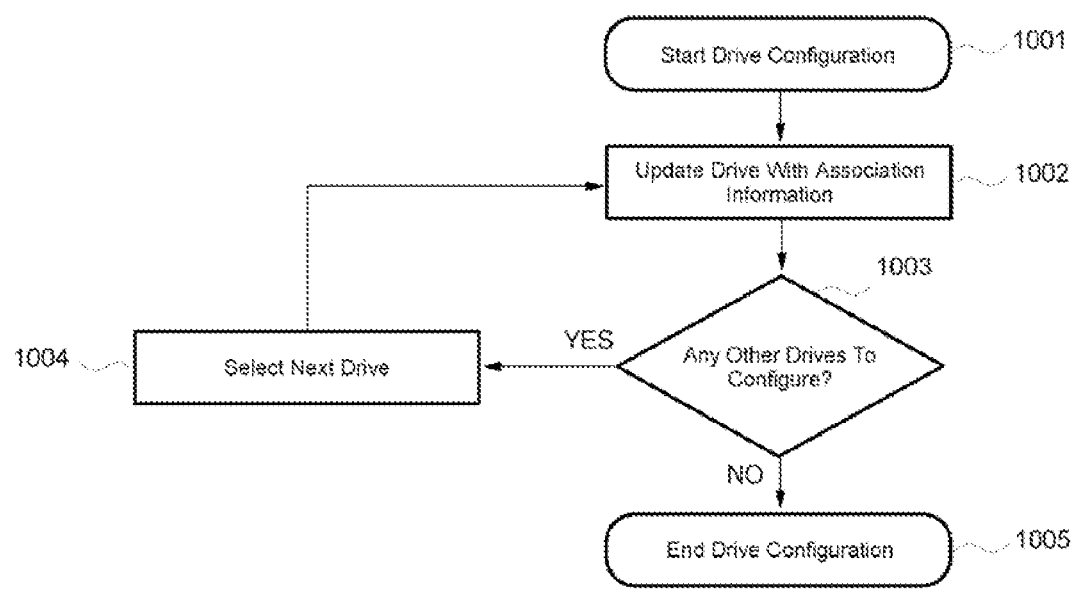
FIG. 10 is a flow chart of a configuration operation of methods of the present invention.

FIG. 10 illustrates a flowchart of a portion of the second, third and fourth embodiments when a data storage drive 15 is configured or initialized. This configuration or initialization may be initiated by a host computer, by the library, by an operator, or by some other means. The configuration or initialization may be performed once only, may be performed at some interval or may be performed based on some event. For example, it may occur at power-on or may occur as the result of a library configuration. At a minimum, the configuration or initialization comprises the sending of library association information to a memory in the drive 15. If the association information is not maintained in nonvolatile memory by the drive 15 then it may be necessary to update the drive 15 at every power-on. The drive 15 configuration begins at step 1001. The drive 15 is updated with library association information in step 1002. The library association information may be sent over a host interface, a library/drive interface, a user interface or some other interface. The interface may comprise a serial interface such as RS-232 or Firewire, a SCSI interface, a Fibre Channel interface, a wireless interface such as infrared or RF, or may comprise any communication interface as is known to those of skill in the art. In step 1003, a check is made to see if there are any other data storage drives to configure. If there are no more data storage drives to configure, as indicated in step 1003, control moves to step 1005 where the drive configuration operation is completed. If on the other hand, there are additional data storage drives to configure, as indicated in step 1003 then control moves to step 1004 where the next data storage drive 15 is selected. Control then moves to step 1002 where the newly selected drive 15 is configured. It will be appreciated that changes may be made to the process illustrated by the flowchart without deviating from the scope of the invention.

Figure 11:
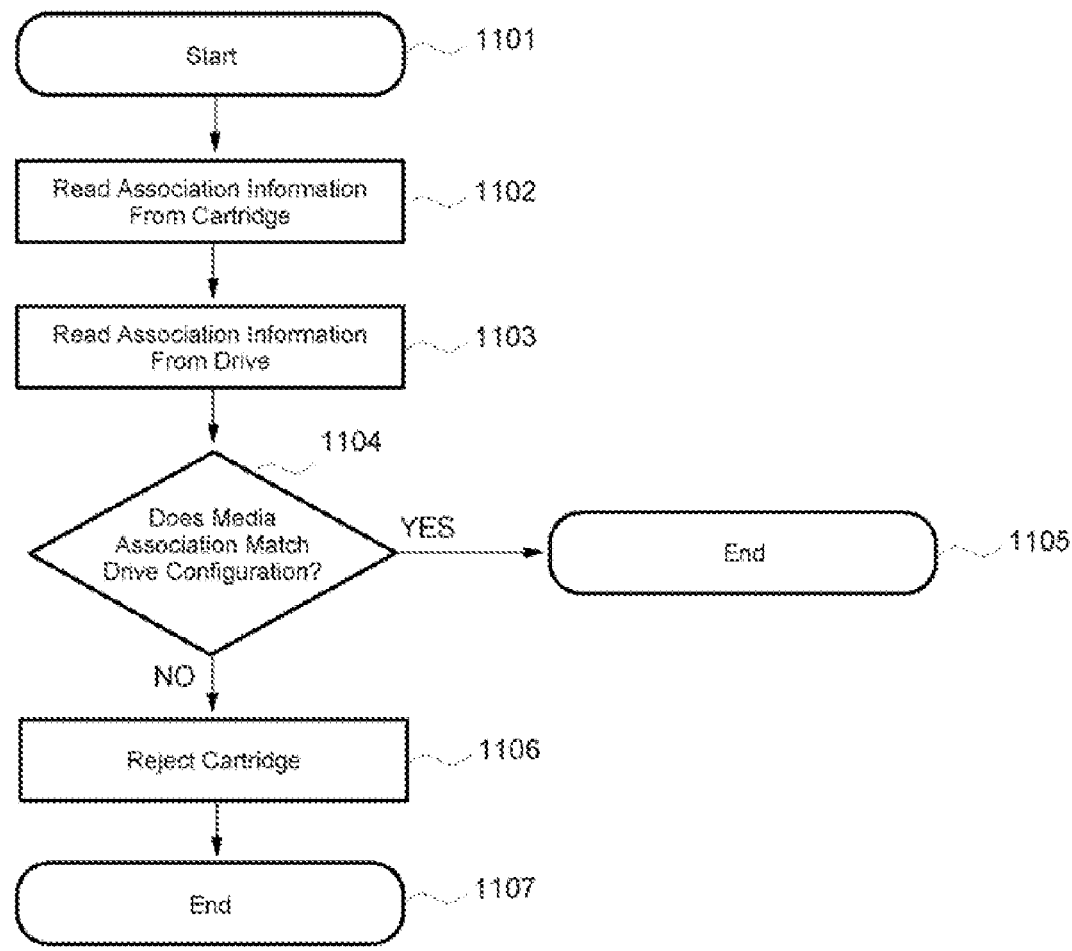
FIG. 11 is a flow chart of the process of checking a cartridge memory in conjunction with a move operation.

FIG. 11 is a flowchart illustrating a portion of the second, third and fourth embodiments after a request has been made to move a data storage cartridge 600 to a drive 15. The request may come from a host computer, the library, a user, or some other means. The flowchart execution may begin before the move operation has started, during the move operation, after the move operation has completed or at some other time. This flowchart may be executed by a host computer, by the library, by an operator, or by some other means. The flowchart begins at step 1101. The library association information is read from the cartridge memory 610 in step 1102. The library association information is read from the memory of the data storage drive 15 in step 1103. In step 1104, a check is made to see if the library association information from the cartridge memory 610 matches the library association information from the data storage drive 15. If the library association information of the drive 15 matches the library association information of the cartridge 600, as indicated in step 1104, control moves to step 1105 where the media move operation is completed. In addition, if other modifications have been made to the cartridge memory 610 or media 612 then these modifications will be corrected to allow proper media access. For example, the first embodiment may be combined with the second embodiment and/or the third embodiment. If on the other hand, the library association information from the drive 15 does not match the library association information from the cartridge 600, as indicated in step 1104 then control moves to step 1106 where the data storage cartridge 600 is rejected. A rejected cartridge may cause a failure of the move operation, a failure to access the data on the cartridge, or some other means to indicate the inability to access the data on the data storage cartridge 600. Control then moves to step 1107 where the process of this flowchart ends. It will be appreciated that changes may be made to the process illustrated by the flowchart without deviating from the scope of the invention. For example, if this process is executed by the drive 15, then it may not be necessary for the drive 15 to read the association information from the drive 15 in step 1103 because the drive 15 already possesses this information.

In a fifth embodiment, this invention may be combined with the teachings of U.S. patent application Ser. No. 09/977,159, filed Oct. 11, 2001 to provide an automated method of securing the data on data storage media in a removable media system. Data stored on the data storage media 612 is encrypted. The keys for gaining access to the stored data may be managed in part, or in full, by the automated data storage library 10. The library 10 may provide the keys to the data storage drive 15 during a move operation, after a library configuration, after a drive or library power-on, or at some other time.

Figure 12:
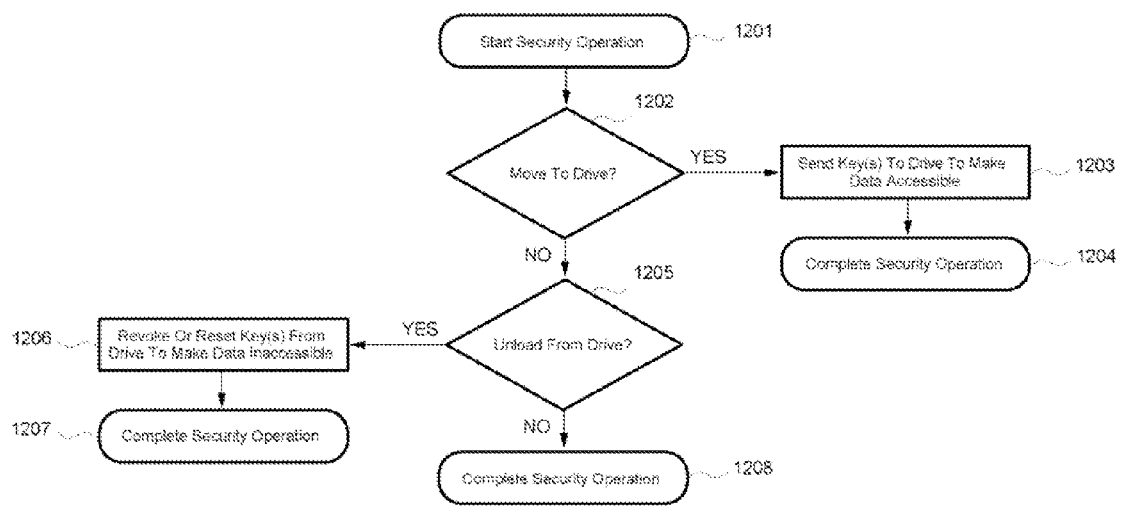
FIG. 12 is a flow chart of the process of managing encryption and/or decryption keys in conjunction with a move operation.

FIG. 12 is a flowchart illustrating the process of the fifth embodiment when data storage media is moved to or unloaded from a data storage drive 15 or when data storage media is moved out of the library 10. The operation may be initiated by a host computer, an operator, the library controller or by some other source. This process may be executed by a host computer, by the library, by a drive, by an operator, or by some other means. The data storage media security operation begins at step 1201 either before, during or after a move or unload operation or some combination thereof. In step 1202, the operation is checked to see if it involves the movement of a data storage cartridge 600 to a drive 15. If the operation involves a move to a drive 15 as indicated in step 1202, then control moves to step 1203 where the proper key(s) are supplied to the drive 15 for accessing data on the data storage media 612. For example, decryption key(s) may be provided to the drive 15 before, during or after the cartridge 600 has been loaded in the drive 15. The key(s) may be provided by the library, by a host, or through some other means. The keys may be used by the drive 15 to decrypt data for a host computer or for the library. Referring back to FIG. 12, after the key(s) have been sent to the drive 15 in step 1203, control moves to step 1204 where the data storage media security operation is completed. If however, the operation does not involve a move to a drive 15 as indicated in step 1202, then control moves to step 1205 where the operation is checked to see if it involves an unload from a drive 15. If the operation does not involve an unload from a drive 15 as indicated in step 1205, then control moves to step 1208 where the data storage media security operation is completed. If however, the operation involves an unload from a drive 15 as indicated in step 1205, then control moves to step 1206 where the key(s) are removed, revoked, reset, disabled or otherwise prevented from allowing the access of data on the data storage media 600. This may comprise a message or command received by the drive 15 to prevent further data access. For example, the host or the library may send a command or message to the drive 15 to revoke the key(s) that were previously sent to the drive 15. Alternatively, the drive 15 may remove the key(s) without any specific command or request from the host or library. For example, the data storage drive 15 may clear the key(s) when it performs a data storage media eject operation. After the key(s) have been removed to make the data on the data storage media 612 inaccessible in step 1206, control moves to step 1207 where the data storage media security operation is completed.

In a variation of the fifth embodiment, the key(s) may be stored in the cartridge memory 610 and/or on the media 612 of the cartridge 600. This would provide the ability to unlock the encrypted data that may be stored on a data storage cartridge. The key(s) may be stored as the result of a request at a user interface of the library, from a host computer, from a remote computer coupled to the library 10 or through any other means. The request to unlock the media may require authentication in the form of one or more keys, a password, or any other authentication method known to those of skill in the art. When media is loaded into a drive, the drive may first check the media 612 or the cartridge memory 610 for the necessary key(s) to unlock the media. For example, if the fifth embodiment is combined with the first embodiment then the cartridge memory modification or corruption may comprise storing the key(s) in the cartridge memory, or removing the key(s) from the cartridge memory. This would apply equally to any modifications of the cartridge memory 610 or the media 612 of all of the embodiments of this invention. In another example, it may be desired to export the data storage cartridge where another drive could access the data stored on the media. If an exported cartridge is imported into another library, the library could remove the key(s) from the cartridge memory 610 or media 612 and keep them for future media access.

This invention may be combined with the teachings of U.S. Pat. No. 6,104,561 to provide an automated method of securing the data on data storage media in a removable media system. In this case, the password or read/write controls for gaining access to the data on the data storage medium may be managed in part, or in full, by the automated data storage library 10. The library 10 may provide the password or read/write controls to the data storage drive 15 when a valid move or unload command has been issued. The flowchart of FIG. 12 may be used to illustrate this embodiment by substituting "key(s)" with "password or read/write controls".

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. An automated data storage library for accessing data storage media in response to commands from at least one external host system, comprising:

a housing unit;

a plurality of storage shelves for storing data storage cartridges within the housing unit, a data storage cartridge including data storage medium and a cartridge memory;

a data storage drive for reading data to and/or writing data from the data storage medium;

a cartridge memory interface for reading data from and/or writing data to at least one predetermined data field of the cartridge memory;

a robot accessor for transporting data storage cartridges between the storage shelves and the data storage drive; and a processor programmed with instructions to:
  modify the data stored in the at least one predetermined data field of the cartridge memory to render data stored on the data storage medium inaccessible; and
  apply a correction to data read from the at least one modified predetermined data field of the cartridge memory wherein data read from the data storage medium is rendered readable to the data storage drive.

2. The automated data storage library of claim 1, wherein the cartridge memory interface is integrated with the storage drive.

3. The automated data storage library of claim 1, wherein the cartridge memory interface is integrated with the robot accessor.

4. The automated data storage library of claim 1, further comprising an export station in the housing unit, the processor further programmed with instructions to require a correct password before the data storage cartridge is removed from the automated data storage library through the export station.

5. A method for accessing data stored on data storage media stored within an automated data storage library, the data storage media housed within a data storage cartridge having a cartridge memory, the method comprising:
   retrieving a data storage cartridge from a storage shelf in the data storage library, at least one predetermined data field in the cartridge memory having first contents whereby data stored on the data storage medium is accessible;
   modifying the at least one predetermined data field of the cartridge memory to have second contents whereby the data stored on the data storage medium is inaccessible;
   providing a correction to the second contents of the at least one predetermined data field of the cartridge memory whereby the data read from the data storage medium is readable to a data storage drive; and
   reading the data stored on the data storage medium.

6. The method of claim 5, wherein the step of modifying the at least one predetermined data field of the cartridge memory is performed by a cartridge memory interface integrated with a robot accessor in the data storage library.

7. The method of claim 5, wherein the step of modifying the at least one predetermined data field of the cartridge memory is performed by a cartridge memory interface integrated with a data storage drive in the data storage library.

8. A computer readable medium having computer-executable instructions to perform the method of claim 5.

9. A controller for an automated storage library, comprising:
   means for receiving a request to move a data storage cartridge;
   means for directing a robot accessor to retrieve the data storage cartridge;
   means for modifying contents of at least one predetermined data field of a cartridge memory of the data storage cartridge to render data stored on the data storage medium inaccessible;
   means for providing access to the data on the data storage medium by directing the data storage drive to apply a correction to the contents of the at least one predetermined data field of the cartridge memory to render the data stored on the data storage medium readable to a data storage drive; and
   means for directing the robot accessor to move the data storage cartridge to a storage shelf within a housing unit of the automated storage library.

10. The controller of claim 9, wherein the cartridge memory interface is integrated with the robot accessor.

11. The controller of claim 9, wherein the cartridge memory interface is integrated with the data storage drive.

12. The controller of claim 9, wherein:
   the automated storage library comprises a plurality of libraries; and
   the controller further comprises means for writing at least one identifier, associated with at least one predetermined library, to the cartridge memory whereby data stored on the data storage medium is accessible only to a drive assigned to the at least one predetermined library.

* * * * *